Aug. 27, 1929.  P. IRVING ET AL  1,726,490
LAWN SPRINKLER
Filed May 11, 1928   2 Sheets-Sheet 1
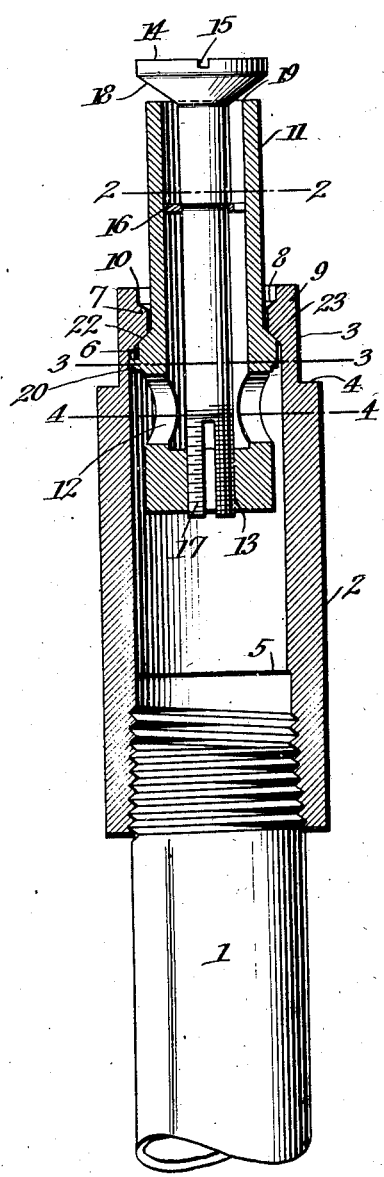
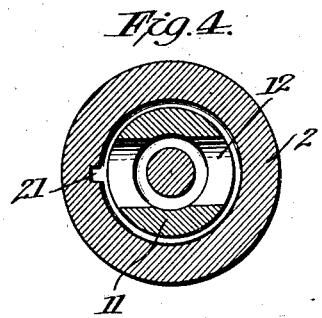
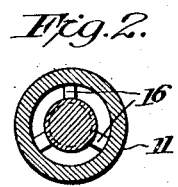
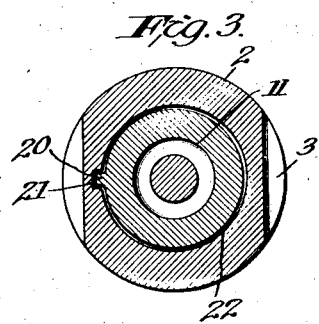
Inventors
Philip Irving
David E. Lindquist
Samuel E. Eusey
Oscar B. Mueller
By Cushman, Bryant Darby
Attorneys Aug. 27, 1929.  P. IRVING ET AL  1,726,490
LAWN SPRINKLER
Filed May 11, 1928   2 Sheets-Sheet 2
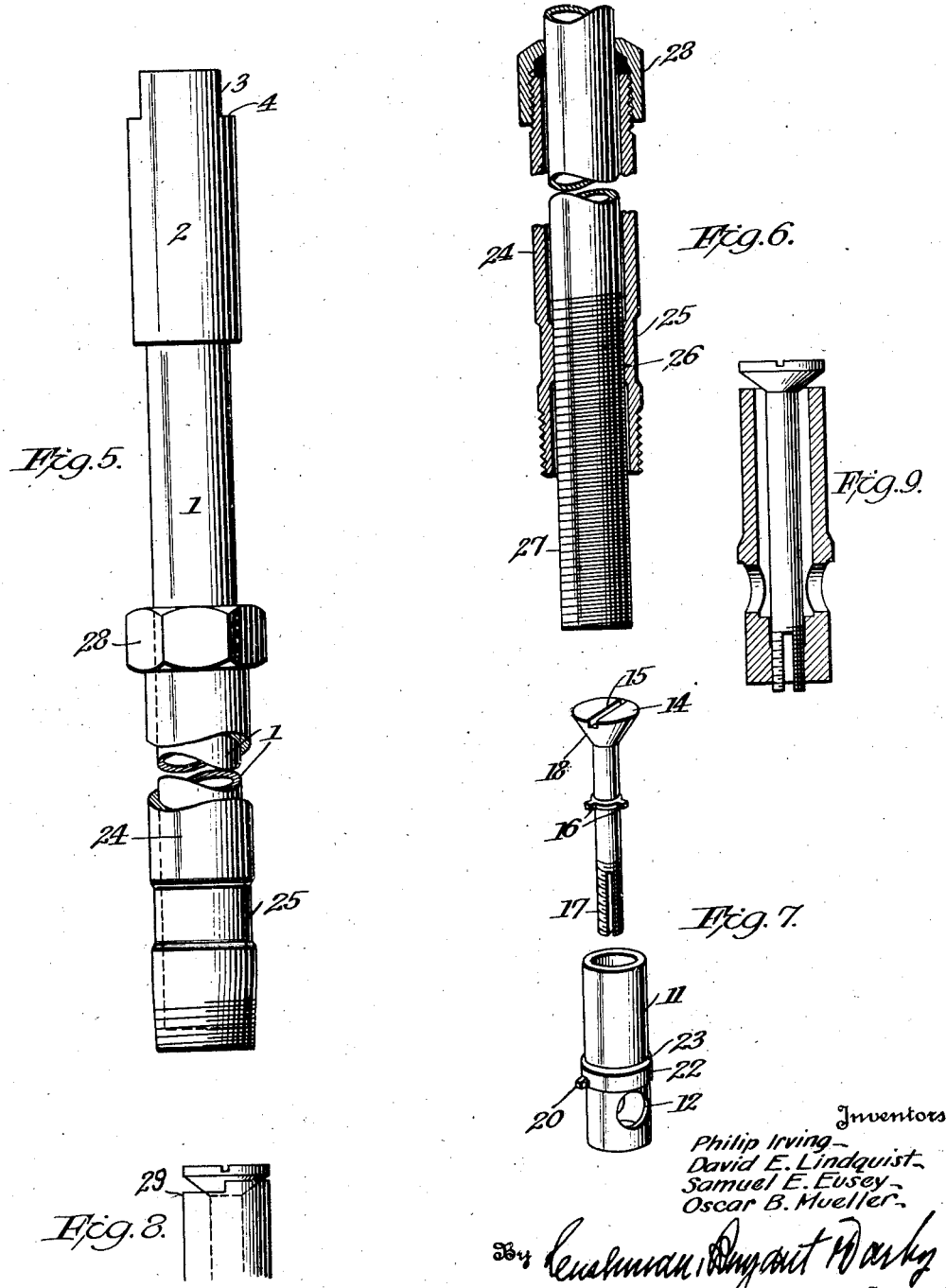

Patented Aug. 27, 1929.

1,726,490

UNITED STATES PATENT OFFICE.

PHILIP IRVING, DAVID E. LINDQUIST, SAMUEL E. EUSEY, AND OSCAR B. MUELLER, OF PORT HURON, MICHIGAN, ASSIGNORS TO MUELLER BRASS CO., OF PORT HURON, MICHIGAN, A CORPORATION OF MICHIGAN.

LAWN SPRINKLER.

Application filed May 11, 1928. Serial No. 277,047.

The present invention relates to a lawn sprinkler, and is more particularly adapted for use where a plurality of automatic sprinklers are employed for watering a large area.

The invention contemplates a simple construction, wherein the spray member is projected under pressure of the water in the system, and upon the removal of the pressure, returns to position and seals the top of the sprinkler.

The invention further employs an adjustable coupling whereby the device may be positioned flush with the level of the ground, and raised or lowered to conform to the surface, as the level thereof may vary.

The device is moreover non-clogging, and by reason of the connection with the main, it is unnecessary to provide any elaborate, or complicated means of adjustment, so that once installed, the invention need not be removed from the ground.

Referring to the drawings:

Figure 1 is a longitudinal section.

Figure 2 is a section on the line 2—2 of Figure 1.

Figure 3 is a section on the line 3—3 of Figure 1.

Figure 4 is a section on the line 4—4 of Figure 1.

Figure 5 is an end view of the coupling.

Figure 6 is a sectional view of the coupling.

Figure 7 is a detailed view of the spray device.

Figure 8 is a plain view.

Figure 9 is a sectional view.

In the drawings, the numeral 1 indicates one pipe of my coupling, which is suitably attached to the usual supply main, as will be described.

The numeral 2 indicates a housing which may have any desired shape, but is preferably a hollow cylinder and threaded to the pipe 1 as shown. It will be understood that the coupling, as well as the housing, will usually be embedded in the ground, and that the top of the cylinder 2 will preferably be disposed flush with the surface so as not to constitute an obstruction for pedestrains, or machinery moving over the lawn.

The cylinder 2, at its upper end is reduced by being cut away on opposite sides to provide angular flat side and bottom walls indicated at 3 and 4, respectively. The object of this is to provide a wrench engaging surface.

The diameter of the interior of the cylinder is decreased from adjacent the point 5 at the lower end to adjacent the point 6 at the upper end, and the housing is provided with an interior circular projection 7 formed substantially intermediate the reduced porportion 3. The projection 7 is bevelled upon opposite sides as shown at 8, and has a straight central wall 9. It will be observed that a shallow circular recess or seat 10 is thus defined by the upper bevelled side 8, and the adjacent wall of the reduced portion 3 of the housing.

Arranged to slide up and down within the housing is a second hollow cylinder 11 of less diameter than said housing. Near its lower end above the solid bottom, the cylinder has formed in its wall one or more openings 12, providing communication with the interior of the housing 2. The lower end of the cylinder 11, and below the opening 12, is preferably made solid as stated and formed with a screw threaded opening 13. Adjustably mounted in the cylinder 11 to move therewith, is a valve or spray member 14. This spray member is provided with a flat, upper surface having a recess 15 therein to receive a screw driver. The spray member comprises a stem formed at a point intermediate its ends with a spider, or guide, 16 and at one end is split and threaded, as shown at 17. The threaded portion 17 is adapted to be received within the threaded opening 13 in the cylinder 11, and it will be clear that by screwing the spray member a greater or less degree, the extent of the opening between the conical undersurface 18 of the spray device and the end 19 of the cylinder 11 may be adjusted.

The cylinder 11 is provided with an exterior lateral stud or guide 20, which in the assembled device, is adapted to slide within a longitudinal groove 21 formed in the portion 5, 6 of the housing. The lower end of the groove 21 opens flush with the wall of the lower end of the housing which is of greater diameter than the portion 5, 6, so that the inner cylinder may easily be assembled in the housing.

The said inner cylinder is shown as having its wall at the lower end thickened, and such portion is defined by the solid bottom already described, and a bevelled portion 23 conforming to the bevel 8 on the projection 7 in the wall of the housing. It will be seen that the bevelled portion 22 acts as a stop for limiting upward movement of the cylinder by engaging said bevelled side 8 as shown at 23 in the drawings.

The upper part of the wall of the cylinder is reduced in thickness from the said bevelled portion 22.

The guide 20, openings 12 and the threaded connection between the spray device and cylinder are all in the thickened portion. Of course, the wall of the cylinder need not be so thickened, in which event a suitable ring or band having a bevelled portion corresponding to the bevel 22 may be formed integral with or connected to the cylinder, and the guide 20 may be formed on the lower part of said band or at an appropriate position on the cylinder. We prefer, however, the construction shown as it gives effective results, better balance and is easier to machine and assemble.

As stated the diameter of the inner cylinder is less than that of the housing and, consequently, a space or water passage is formed between the two members in the assembled structure so that water entering the housing may pass with increased force into the inner cylinder through the openings 12.

Referring to Figures 5 and 6, it will be noted that the pipe 1 which is connected to the cylinder 2 and communicates therewith, is also connected to a second pipe 24. The pipe 24 is threaded at its lower end and is connected to any suitable source of water, such as an underground main. The said pipe 24, at a point intermediate its ends, is swaged in as shown at 25, and the interior wall of the swaged portion is threaded as at 26. The pipe 1 is preferably formed with a considerable number of screw threads at its lower end, as at 27, so that said pipe carrying the sprinkler and threaded in the pipe 24 may be readily adjusted within said pipe and with respect to the ground surface. This, of course, is permitted by the threaded relation between the threads 27 on the pipe 1 and the threads 26 on the interior of the swaged wall 25.

Instead of having the pipe 1 provided with a long exterior threaded portion, it may, of course, have a short threaded enlargement corresponding to the threaded portion 26 and the pipe 24 may then be threaded for the major portion of its length. Moreover, either construction may be employed and the pipe 1 interiorly threaded to receive the pipe 24, which, of course, will be exteriorly threaded.

In assembling the device, the cylinder 11 is inserted in the bottom of the housing 2, so that the projection 20 may slip into place in the groove 21. The spray device 14 is then inserted in the top of the cylinder 11 and by reason of the guide 16, will be brought into alignment with the threaded opening 13 in the bottom of the cylinder 11, whence it may then be threaded in said opening to the desired extent, depending upon the size of the spray desired. The housing may then be threaded to the pipe 1 which communicates with the main as heretofore described.

In operation, presuming that the device is in the ground and that the upper end of the housing 2 is flush with the surface, if the pressure is off, the inner cylinder 11 will be in lowered position with the spray member occupying the bevelled recess or seat 10, formed in the upper end of the housing. In this position, the spray member will be the sole means of vertical support for the inner cylinder. It will be understood that the spray member when seated within the recess 10, will have its upper surface flush with the upper end of the housing 2, and that consequently a smooth continuous top is provided conforming to the ground level.

When the pressure is turned on the water will strike the flat bottom wall of the inner cylinder and by reason of the narrow passage about the inner cylinder will be caused to enter the openings 12 with increased force and exert a pressure upon the spray member. In this manner, the inner cylinder will be forced upwardly, and since the spray member will be unseated, the water will pass onto the law in the desired manner. The bevel 22 will be caused to contact with the lower bevel 8 on the housing as shown as 23 to provide a stop for the cylinder as well as form a tight leak-proof joint.

When the pressure is turned off, the inner cylinder will, of course, fall and the spray member 14 will be seated in the recess 10 with its conical portion 18 resting on the upper bevelled portion 8 of the projection 7. This provides a non-clogging joint which is necessary with automatic sprinklers of this character.

With respect to the size of the spray, this, of course, may be easily adjusted by turning the spray member 14 a greater or less degree within the threaded opening 13.

In order to adjust the sprinkler proper to accord with the ground level, it is only necessary to apply a wrench to the wrench engaging portion 3 of the housing 2, whereby the pipe 1 may be screwed either up or down within the member 24 to raise or lower the upper surface of the sprinkler.

I have provided a packed joint indicated as a whole at 28 between the pipe 1 and the fixed member 24 so as to prevent any possibility of leakage.

In Figure 8, we have shown a modified form of sprinkler head in which the top of the cylinder 11 is cut away for a portion of its periphery as shown at 29. The depth of the cut is substantially $\frac{1}{32}''$, but, of course, it may be greater or less, as desired. The extent of the cut is preferably less than the entire circumference of the cylinder 11 and is usually 90° or 180°. The purpose of such construction is to provide for spraying along the edge of a sidewalk or building and, in some cases, along the side of a golf green.

It will be understood that with this construction, the tapered portion 19 will rest upon the uncut portion of the periphery of the cylinder which can be accomplished by screwing the stem an appropriate distance into the bottom of the cylinder, so that when the cylinder is projected, the water will pass out through the space provided by the cut away portion and the adjacent beveled surface of the spray member.

The guide 20 and groove 21 are particularly employed where the construction shown in Figure 5 is found necessary, since, by this construction, it will be possible to properly position the device so that the spray may be directed away from a wall or side.

It will be understotod that in other cases the groove and guide are not necessary, but they are shown in the drawing, in order to fully illustrate the invention and its modifications.

In Figure 9, we have shown a construction wherein the spider or guide 16 may be eliminated. For this purpose, the threaded portion 17 is shortened and the threads in the bore 13 may be similarly reduced, as shown. It is not essential that the threaded portion 13 may be reduced, but it will be satisfactory in some cases. With such a construction, when the threaded portion 17 is engaged in the bottom of a cylinder, a portion of the solid part of the stem will engage in the bore or opening, whether it be threaded or not and in this manner the stem will be suitably positioned, so as to be guided or journalled in the cylinder.

We claim:—

1. A device of the class described comprising a housing, a hollow projectable spray member disposed therein, said member having an intermediate flange engaging an internal flange on the housing to limit the movement of said member, one end of the spray member being closed to form a solid piston portion spaced from the wall of the housing, lateral openings formed in the spray member above said piston portion and establishing communication between said housing and said member and a spray device adjustably mounted in the closed end of said spray member.

2. A device of the class described comprising a housing, a hollow water projectable spray member movable therein, the said housing having a reduced upper end, an internal flange formed in said reduced portion and oppositely bevelled to provide seats, said spray member having an intermediate bevelled enlargement engaging one of said seats and having one end closed, lateral openings formed in said spray member between said enlargement and the closed end of the member, a spray device having one end threaded in the closed end of the spray member, said spray device being formed with an intermediate spider engaging the wall of the spray member, and the opposite end of said spray device being formed with a conical valve engaging the other of said seats when the spray member is in retracted position.

In testimony whereof we have hereunto set our hands.

PHILIP IRVING.
DAVID E. LINDQUIST.
SAMUEL E. EUSEY.
OSCAR B. MUELLER.